United States Patent
Li et al.

(10) Patent No.: US 9,525,343 B2
(45) Date of Patent: Dec. 20, 2016

(54) SWITCHING POWER SUPPLY USING IN DEVICE HAVING HIGH PEAK CURRENT CHARACTERISTIC

(71) Applicants: Dong-Sheng Li, Taipei (TW); Chia-Wei Lin, Taipei (TW); Kuang-Feng Lin, Taipei (TW); Ching-Pao Hsiao, Taipei (TW); Gen-Jie Hsiao, Taipei (TW); Chen-Sheng Lee, Taipei (TW)

(72) Inventors: Dong-Sheng Li, Taipei (TW); Kuang-Feng Lin, Taipei (TW); Chia-Wei Lin, Taipei (TW)

(73) Assignees: Dong-Sheng Li, Taipei (TW); Chia-Wei Lin, Taipei (TW); Kuang-Feng Lin, Taipei (TW); Ching-Pao Hsiao, Taipei (TW); Gen-Jie Hsiao, Taipei (TW); Chen-Sheng Lee, Taipei (TW)

( * ) Notice: Subject to any disclaimer, the term of this patent is extended or adjusted under 35 U.S.C. 154(b) by 0 days.

(21) Appl. No.: 14/798,532

(22) Filed: Jul. 14, 2015

(65) Prior Publication Data

US 2016/0013717 A1     Jan. 14, 2016

(30) Foreign Application Priority Data

Jul. 14, 2014    (TW) .............................. 103124082 A

(51) Int. Cl.
     *H02M 3/156*     (2006.01)
     *H02M 1/00*      (2006.01)

(52) U.S. Cl.
     CPC ..... *H02M 3/156* (2013.01); *H02M 2001/0022* (2013.01)

(58) Field of Classification Search
     CPC ..................... H02M 2001/0022; H02M 3/156; H02M 2001/0035; H02M 2001/0045
     See application file for complete search history.

(56) References Cited

U.S. PATENT DOCUMENTS

| | | | |
|---|---|---|---|
| 2004/0155844 A1 | 8/2004 | Stopa | |
| 2004/0263116 A1* | 12/2004 | Doruk | ..................... F01K 13/00 320/107 |
| 2008/0018174 A1 | 1/2008 | Yang | |

(Continued)

FOREIGN PATENT DOCUMENTS

TW      TW201348943 A      12/2013

*Primary Examiner* — Jessica Han
*Assistant Examiner* — Bart Iliya
(74) *Attorney, Agent, or Firm* — Alan D. Kamrath; Kamrath IP Lawfirm, P.A.

(57) ABSTRACT

A switching power supply is provided and connected between external voltage source and a device having high peak current characteristic, the switching power supply comprises boost converter, control circuit and energy storing element. An input end of boost converter is connected to external voltage source, and output end of boost converter is electrically connected to the device. A control circuit is connected to boost converter in parallel. A first predetermined voltage value and a predetermined current value is set in control circuit. When output current of external voltage source is larger than predetermined current value or output voltage of external voltage source is lower than first predetermined voltage value, output voltage of boost converter is reduced to be lower than the voltage of energy storing element by control circuit.

14 Claims, 8 Drawing Sheets

(56) References Cited

U.S. PATENT DOCUMENTS

| | | | |
|---|---|---|---|
| 2009/0018384 A1* | 1/2009 | Boyden | A61N 2/02 600/13 |
| 2009/0072779 A1* | 3/2009 | Kuhlmann | H02J 7/35 320/101 |
| 2012/0011376 A1 | 1/2012 | Zai et al. | |
| 2012/0286691 A1* | 11/2012 | Jesme | H05B 33/0818 315/250 |
| 2014/0091621 A1 | 4/2014 | Hsu et al. | |
| 2015/0300307 A1* | 10/2015 | Setterberg | F02N 11/087 701/113 |

* cited by examiner

SWITCHING POWER SUPPLY USING IN DEVICE HAVING HIGH PEAK CURRENT CHARACTERISTIC

FIELD OF THE INVENTION

The present invention relates to a switching power supply, more particularly relates to a switching power supply using in a device having high peak current characteristic.

BACKGROUND OF THE INVENTION

Hard disk drives are very important data saving carriers for the present computer, capacity of the hard disk drive has been increased gradually because of the technical development, and comparing with compact disk (CD) the hard disk drive has the advantages of large capacity and high speed data transmission. Therefore, a mobile hard disk drive (external hard drive enclosure) has become the common device in the present.

3.5 inches hard disk drive has largest capacity and long-life characteristic. As a result, many users like to use it. However, the 3.5 inches hard disk drive has large size and higher power consumption. For the 3.5 inches hard disk drive, besides of 5 V from an USB port, a 12 V input voltage to drive a motor is also needed. Therefore, the 3.5 inches mobile hard disk drive (or 3.5 inches hard drive enclosure) needs an extra 12 V power adapter to drive the motor, and this causes inconvenience in carrying.

In order to solve the above-mentioned problem, a solution is disclosed in the patent publication US20140091621. In US20140091621, a battery is disposed in a shell and used to provide the energy to start up the hard disk drive. In the 3.5 inches mobile hard disk drive disclosed in US2014091621, any extra power supply is not needed, but a high-cost battery having lower inner resistance and occupying large space is needed. Furthermore, when the motor is driven by the USB port in a high output current, the output voltage of the USB port may be decreased and not high enough to drive the control circuit in the mobile hard disk drive.

It is thus desirable to provide a cheaper☐ smaller battery design to drive 3.5 inches hard disk drive with only 5 V from USB port and does not need any extra 12 V power adapter.

SUMMARY OF THE INVENTION

One object of the present invention is to provide a switching power supply which is disposed in a device having high peak current characteristic. Therefore, by using the switching power supply of the present invention, the extra adapter to start up and drive the device having high peak current characteristic is not needed, and the overall cost of the switching power supply and the energy storing element is reduced.

To achieve the foregoing and other object, a switching power supply is provided in the present invention and connected between an external voltage source and at least one device having high peak current characteristic. The switching power supply comprises a boost converter, a control circuit, a charging circuit, a discharging circuit, and an energy storing element. An input end of the boost converter is electrically connected to the external voltage source, and an output end of the boost converter is electrically connected to the device having the high peak current characteristic. The control circuit is connected to the boost converter in parallel, and the control circuit is configured to sense the output voltage of the external voltage source. The control circuit has a first predetermined voltage value and a predetermined current value. An input end of the charging circuit is connected to an output end of the boost converter. An output end of the discharging circuit is electrically connected to the device having the high peak current characteristic. An output end of the energy storing element is connected to an input end of the discharging circuit and an output end of the charging circuit. When the output current of the external voltage source is larger than the predetermined current value or the output voltage of the external voltage source is lower than the first predetermined voltage value, the output voltage of the boost converter is reduced quickly to be lower than the voltage of the energy storing element by the control circuit. With this control method, when the device having high peak current characteristic starts up and takes heavy current, the boost converter and the energy storing element can provide sufficient energy simultaneously.

The above-mentioned switching power supply further comprises a first switch element, and an input end of the first switch element is connected to the external voltage source. The first switch element is connected to the input end of the discharging circuit and output end of the charging circuit. When the output voltage of the external voltage source is zero, the first switch element is not electrically conducted. When the output voltage of the external voltage source is larger than zero, the first switch element is electrically conducted.

The above-mentioned switching power supply further comprises at least a switch module. The switch module comprises a second switch element and a monitoring circuit, the second switch element is electrically connected between the boost converter and the device having the high peak current characteristic, and the monitoring circuit is electrically connected between the boost converter and the second switch element. When the output voltage of the boost converter exceeds a second predetermined voltage value, the second switch element is electrically conducted.

In the above-mentioned switching power supply, a predetermined period of time is set in the monitoring circuit. After the switching power supply receives power sent from the external voltage source for the predetermined period of time, the second switch element is electrically conducted.

The switching power supply is provided in the present invention, and the switching power supply is connected between an external voltage source and at least one device having high peak current characteristic. The switching power supply comprises a boost converter, a control circuit, a charging circuit, a discharging circuit, an energy storing element, and a buck converter. An input end of the boost converter is connected to the external voltage source, and an output end of the boost converter is electrically connected to the device having the high peak current characteristic. The control circuit is connected to the boost converter in parallel. The control circuit is configured to sense the output voltage of the external voltage source. The control circuit has a first predetermined voltage value and a predetermined current value. An input end of the charging circuit is electrically connected to an output end of the boost converter. An output end of the discharging circuit is electrically connected to the device having the high peak current characteristic. An output end of the energy storing element is connected to an input end of the discharging circuit and an output end of the charging circuit. An output end of the buck converter is connected to the device having high peak current characteristic. When the output current of the external voltage source is larger than the predetermined current value or the output voltage of the external voltage source is lower than the predetermined voltage value, the output voltage of the boost converter is reduced quickly to be lower than the voltage of the energy storing element by the control circuit. With this control method, when the device having high peak current characteristic starts up and takes heavy current, the boost converter and the energy storing element can provide sufficient energy simultaneously.

The above-mentioned switching power supply further comprises a first switch element. An input end of the first switch element is connected to the external voltage source. The first switch element is connected to the input end of the discharging circuit and the output end of the charging circuit. When the output voltage of the external voltage source is zero, the first switch element is not electrically conducted. When the output voltage of the external voltage source is larger than zero, the first switch element is electrically conducted. The above-mentioned switching power supply further comprises at least a switch module. The switch module comprises a second switch element and a monitoring circuit, the second switch element is electrically connected between the boost converter and the device having high peak current characteristic, and the monitoring circuit electrically connected between the boost converter and the second switch element. When the output voltage of the boost converter exceeds a second predetermined voltage value, the second switch element is electrically conducted.

In the above-mentioned switching power supply, a predetermined period of time is set at the monitoring circuit. After the power sent from the external voltage source is received by the switching power supply for the predetermined period of time, the second switch element is electrically conducted.

In the above-mentioned switching power supply, the discharging circuit is a diode or a discharging control circuit having a switch.

In the above-mentioned switching power supply, the energy storing element is charged by the charging circuit in the constant voltage or/and constant current.

In the above-mentioned switching power supply, a current sensor connected between the external voltage source and the boost converter is further comprised, and the current sensor is configured for sensing the output current of the external voltage source.

The present invention is illustrated by the following embodiments. However, it should be understood that the invention is not limited to the specific details of these embodiments.

DETAILED DESCRIPTION OF THE INVENTION

Figure 1A:
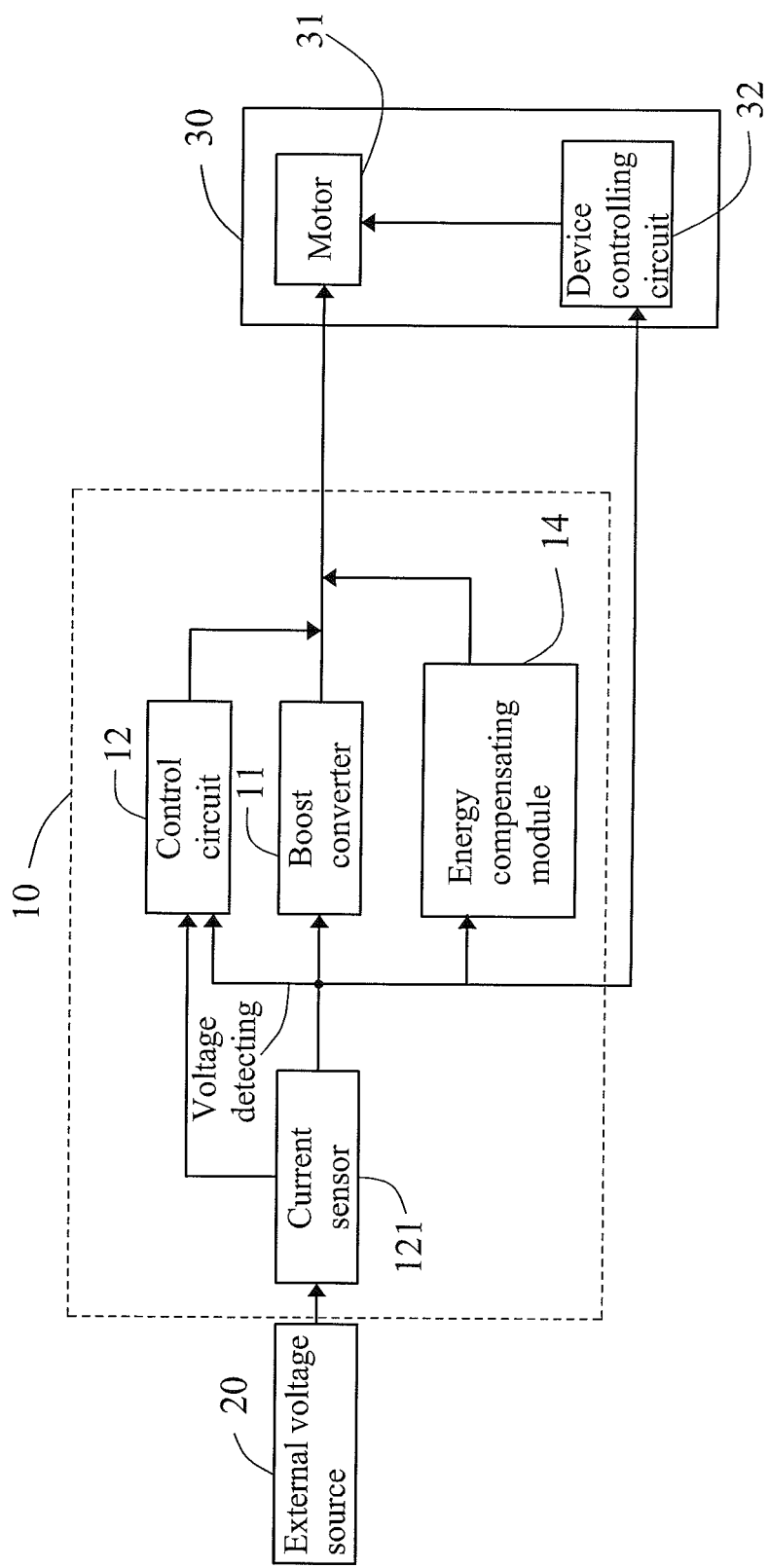
FIG. 1A illustrates a schematic diagram of a switching power supply of the present invention.

Please refer to FIG. 1A which illustrates a schematic diagram of a switching power supply 10 of the present invention. The switching power supply 10 is connected between an external voltage source 20 and a device having high peak current characteristic 30. For example, the external voltage source 20 is an USB port of the personal computer and provides 5 V. In general, the USB port has a standard range for output voltage and output current, but the maximum output current of the USB port is actually much larger than the standard range. However, the output voltage would be reduced as the output current increases. For example, the standard range of an USB 3.0 is 4.75 V~5.25 V/0.9 A. Actually, the maximum current provided by the USB 3.0 exceeds the 0.9 A. For example, the device having the high peak current characteristic 30 of the present embodiment is a 3.5 inches hard disk drive, and thus the device having the high peak current characteristic 30 comprises a motor 31 and a device controlling circuit 32. The motor 31 is connected to the switching power supply 10, and the device controlling circuit 32 is connected to the external voltage source 20. When the motor 31 receives the 12 V input voltage (this input voltage is converted by the USB port), the device controlling circuit 32 also has to receive the 5 V input voltage, so that the device having high peak current characteristic 30 can be driven, started up and work normally.

The switching power supply 10 comprises a boost converter 11, a control circuit 12, a current sensor 121, and an energy compensating module 14. The current sensor 121 is connected to an output end of the external voltage source 20, and the current sensor 121 is configured to sense an output current of the external voltage source 20. An input end of the boost converter 11 is connected to the current sensor 121, and an output end of the boost converter 11 is electrically connected to the motor 31 of the device having the high peak current characteristic 30. The 5 V provided by the external voltage source 20 is converted to 12 V~12.6 V by the boost converter 11, so as to correspond for the 12 V input voltage of the motor 31.

Figure 1B:
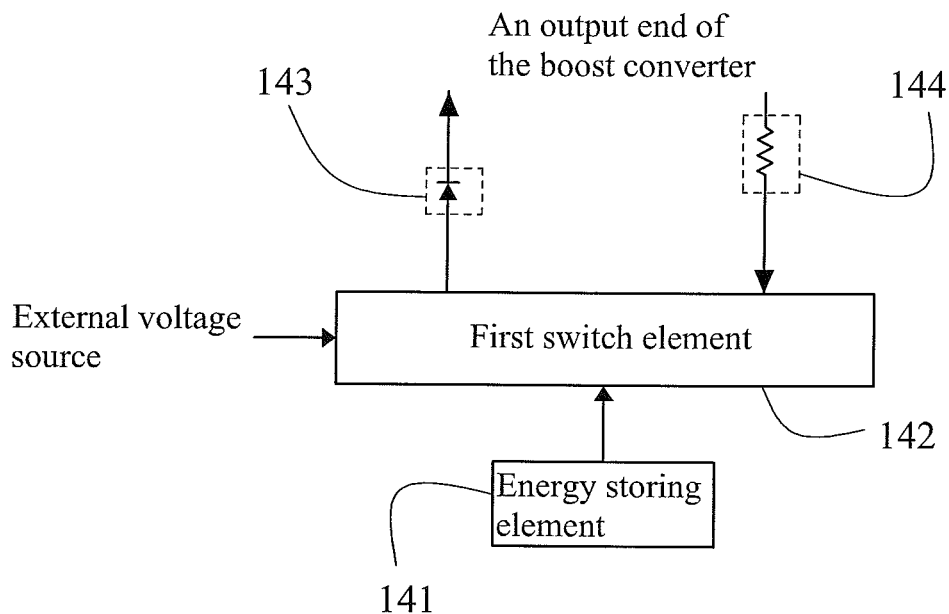
FIG. 1B illustrates a detail architecture diagram of an energy compensating module.

Please refer to FIG. 1B which illustrates a detail architecture diagram of an energy compensating module 14. The energy compensating module 14 comprises an energy storing element 141, a first switch element 142, a discharging circuit 143, and a charging circuit 144. For example, the energy storing element 141 is a lithium battery or a capacitor bank, and the energy storing element 141 is configured to output 12.6 V in maximum. However, the voltage of the energy storing element 141 does not have a specified value at normally working and depends on how much energy it has. The energy storing element 141 is connected to the first switch element 142. The first switch element 142 is electrically conducted when the power of the external voltage source 20 is inputted to the switching power supply 10. On the contrary, the first switch element 142 is not electrically conducted when the voltage of the external voltage source 20 is zero. Therefore, the first switch element 142 is not electrically conducted when the power is not provided by the external voltage source 20, so as to avoid the energy stored in the energy storing element 141 running out because of electric leakage in the circuit.

The first switch element 142 is electrically conducted when the power is inputted to the switching power supply 10 from the external voltage source 20, so as to make the energy storing element 141 be charged and discharged normally. An input end of the discharging circuit 143 is connected to the first switch element 142, and an output end of the discharging circuit 143 is connected to the output end of the boost converter 11. An input end of the charging circuit 144 is connected to the output end of the boost converter 11, and an output end of the charging circuit 144 is connected to the first switch element 142. The discharging circuit 143 is an uni-directional blocking circuit, and the discharging circuit 143 is not electrically conducted when an output voltage of the boost converter 11 is larger than the voltage of the energy storing element 141, so as to charge the energy storing element 141 via the charging circuit 144. The uni-directional blocking circuit of the discharging circuit 143 has many types, for example: a diode (shown in FIG. 1B) or the discharging control circuit 12 having a switch and control circuit etc. The energy storing element 141 is charged by the charging circuit 144 in the constant voltage and/or constant current mode, the charging circuit 144 also has many types, for example: a current-limiting resistor or a linear regulator etc. The above-mentioned types of the discharging circuit 143 and charging circuit 144 are the examples, but are not limited in them, a person having ordinary skills in the art could adjust types of the discharging circuit 143 and charging circuit 144 according to the practical demand.

The discharging circuit 143 and the charging circuit 144 are designed as an independent circuit, respectively. This is because the performance of charging and discharging for the energy storing element 141 would be limited if only one current-limiting resistor is used as a charge-discharge path. For example, the energy storing element 141 would discharge quickly and with large current if using the current-limiting resistor with smaller resistance value, the life of the energy storing element 141 would be harmful because of larger discharging/charging current, and the derived output current from the boost converter 11 is increased as well. Then, the current provided for the device having high peak current characteristic 30 is decreased, because a large amount of output current of the boost converter 11 has to be shared to the energy storing element 141 due to smaller current-limiting resistance. If the energy compensating module 14 uses a larger current-limiting resistance to reduce discharging and charging current of the energy storing element 141, then the maximal output current provided by the switching power supply 10 is also limited, the device having high peak current characteristic 30 may not be driven and started up smoothly and running well due to lesser discharging current coming from energy compensating module 14. Therefore, in the present invention the discharging circuit 143 and the charging circuit 144 are designed respectively, so as to make the energy storing element 141 discharge quickly and large current to support the output voltage of the boost converter 11 when the device takes high peak current, and the energy storing element 141 is stably and slowly charged with much smaller current in normal operating state of device so as to increase the life of the energy storing element 141.

The element relationship of the switching power supply 10 is described in the above; the operating method of the switching power supply 10 is introduced as the following. A 5 V is applied to the boost converter 11 and the first switch element 142 respectively, when the external voltage source 20 applies the 5 V to the switching power supply 10; the first switch element 142 is electrically conducted when the first switch element 142 receives the 5 V output voltage from the external voltage source 20, so as to electrically connect the energy storing element 141 with the charging circuit 144 and the discharging circuit 143, and the 5 V applied from the external voltage source 20 is boosted to the 12~12.6 V by the boost converter 11, the 12~12.6 V is outputted from the output end of the boost converter 11.

The control circuit 12 is connected to the current sensor 121, and connected to the boost converter 11 in parallel. The output voltage of the boost converter 11 is controlled by the control circuit 12 in order to limit input current and input voltage of the switching power supply 10 or limit the output current of the boost converter 11. On the other hand, the boost converter 11 would be not even damaged by overload. The control circuit 12 senses the output current of the external voltage source 20 by the current sensor 121, and the control circuit 12 is also configured to sense the output voltage of the external voltage source 20 (the input voltage of the boost converter 11). A first predetermined voltage value and a predetermined current value are set in the control circuit 12. The output voltage of the boost converter 11 is reduced quickly by the control circuit 12 when the output current of the external voltage source 20 is larger than the predetermined current value or the output voltage of the external voltage source 20 is lower than the first predetermined voltage value, so as to reduce the output voltage of the boost converter 11 to be lower than the voltage of the energy storing element 141, then the energy storing element 141 discharges with large current through the discharging circuit 143☐ With this control method☐ when the sudden moment of startup or peak current from the device having the high peak current characteristic 30, the energy storing element 141 and the boost converter 11 can provide energy to the device having the high peak current characteristic 30 simultaneously to sustain output voltage of the boost converter 11 on certain level. More different matches/combinations can be made by limiting the above-mentioned input current and input voltage of the switching power supply 10 or the output current of the boost converter 11. For example, the input current and the input voltage of the switching power supply 10 are detected at the same time, or the method of only limiting the output current is used, a person having ordinary skills in the art could adjust the method of limiting an input power according to the practical demand.

In some embodiment, because the motor 31 needs larger current during startup, the input current of the switching power supply 10 is quite high, too. As a result, the output voltage of the external voltage source 20 is gradually reduced because the output current is increased. The device having high peak current characteristic 30 would not be normally driven, if the output voltage of the external voltage source 20 is too low to drive the device controlling circuit 32 of the device having high peak current characteristic 30, even though the motor 31 receives 12 V stably. So, in this invention, the output voltage of the boost converter 11 is quickly reduced by the control circuit 12 when the output voltage of the external voltage source 20 is reduced to be lower than the first predetermined voltage value or the output current of the external voltage source 20 is larger than the predetermined current value. Therefore, an output power of the boost converter 11 is limited within a certain range, and the input voltage of the switching power supply 10 is never lower than the first predetermined voltage value, or the input current of the switching power supply 10 is never larger than the predetermined current value so as to limit the maximum output current and the minimum output voltage of external voltage source 20. The discharging circuit 143 is electrically conducted when the output voltage of the boost converter 11 is reduced until lower than the output voltage of the energy storing element 141. Then, the energy storing element 141 starts to discharge with large current so that the energy storing element 141 and the boost converter 11 can together provide output current simultaneously to the device having high peak current characteristic 30. Then the motor 31 of the device having high peak current characteristic 30 can be normally driven and started up, and ensuring the enough output voltage of external voltage source 20 is provided to drive the device controlling circuit 32 so as to drive the device having high peak current characteristic 30 normally. The external voltage source 20 is protected by limiting the maximum input current of the switching power supply 10 so as to avoid the external voltage source 20 stopping to provide the current. By limiting the minimum input voltage, the device controlling circuit 32 (or the device having high peak current characteristic 30) can be driven and work normally.

And then, the driving current of the motor 31 is gradually reduced when the device having high peak current characteristic 30 gradually enters into the stable operation from startup, the values of the input voltage and the input current of the switching power supply 10 deviates from the first predetermined voltage value and the predetermined current value of the control circuit 12 gradually. Then, the control circuit 12 recovers the output voltage of the boost converter 11 to an original predetermined value 12~12.6 V, and the output voltage of the boost converter 11 is larger than the voltage of the energy storing element 141 from then on. The discharging circuit 143 is not electrically conduct when the discharging circuit 143 is reversed bias, the output voltage of the boost converter 11 is applied to the motor 31 so as to make the motor 31 be driven in the stable operation, and the energy storing element 141 is charged by the boost converter 11 via the charging circuit 144.

Figure 1C:
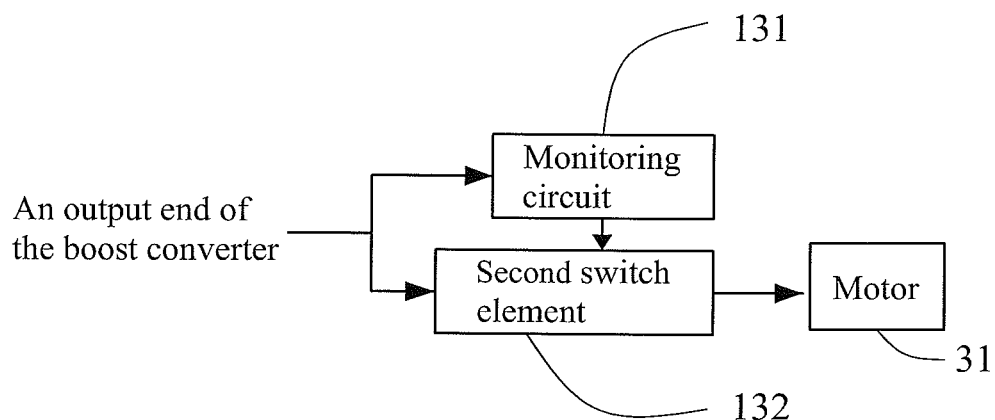
FIG. 1C illustrates a detail architecture diagram of a switch module.
Figure 1D:
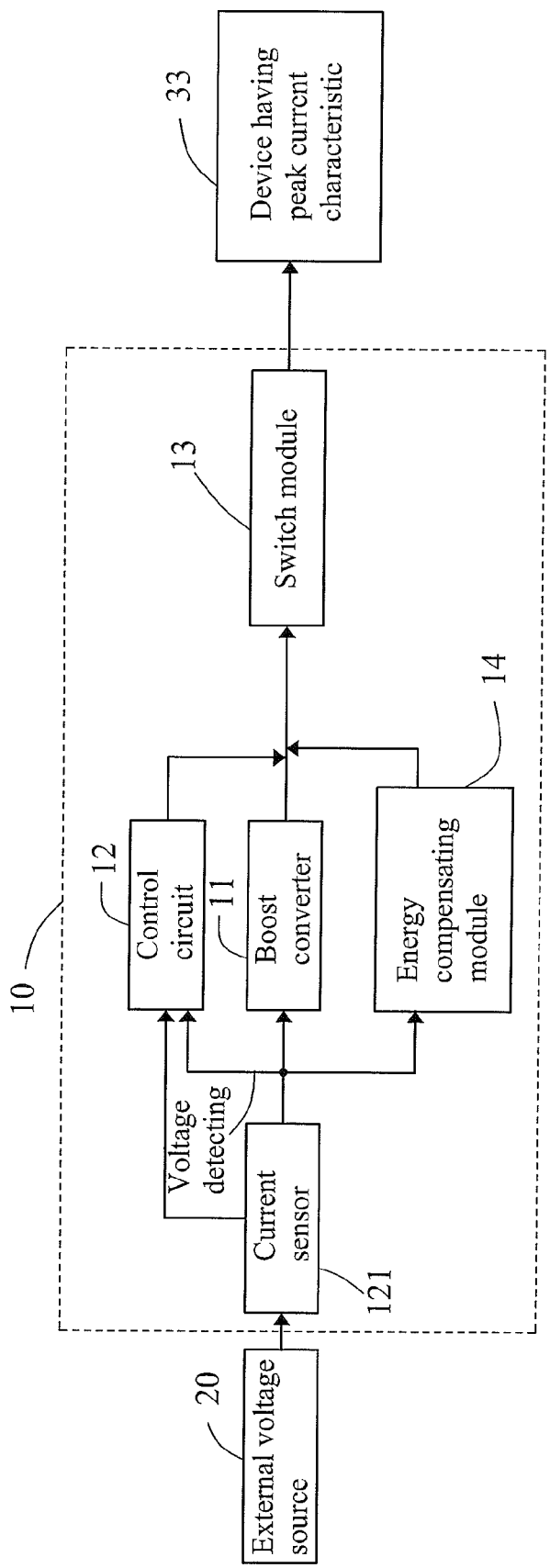
FIG. 1D illustrates a schematic diagram of the switching power supply applied in the device having high peak current characteristic without the control circuit.

Please refer to FIG. 1C and FIG. 1D, FIG. 1C illustrates a detail architecture diagram of a switch module 13, FIG. 1D illustrates a schematic diagram of the switching power supply 10 applied in the device having high peak current characteristic 30 without the control circuit 32. The device having high peak current characteristic 30 of the above-mentioned embodiment is the 3.5 inches hard disk drive and includes the device controlling circuit 32. When the input energy of the device having high peak current characteristic 30 is enough to drive the motor 31, and the device controlling circuit 32 receives a startup command, then the motor 31 derives current from the switching power supply 10. However, not all of the devices having high peak current characteristic 30 includes the device controlling circuit 32. Thus, a switch module 13 is also disposed in the switching power supply 10, and the switch module 13 is connected between the boost converter 11 and the device having high peak current characteristic 33. The switch module 13 includes a monitoring circuit 131 and a second switch element 132. Some time is needed for boosting the voltage 5 V from the external voltage source 20 to the 12~12.6 V, and the output end of the boost converter 11 is detected by the monitoring circuit 131. The monitoring circuit 131 transmits a signal to the second switch element 132 when the output voltage of the boost converter 11 reaches a second predetermined voltage value, and the second switch element 132 is electrically conducted so as to smoothly drive the device having high peak current characteristic 33 by enough voltage. Furthermore, the second switch element 132 is controlled by the monitoring circuit 131 via setting a predetermined period of time. For example, the predetermined period of time can be set as two seconds if the time needed for boosting from 5 V to 12 V by the boost converter 11 is two seconds. In other words, when the monitoring circuit 131 detects that the power is transmitted from the external voltage source 20 into the switching power supply 10, after two seconds, the signal is transmitted to the second switch element 132 and the second switch element 132 is electrically conducted.

Figure 2:
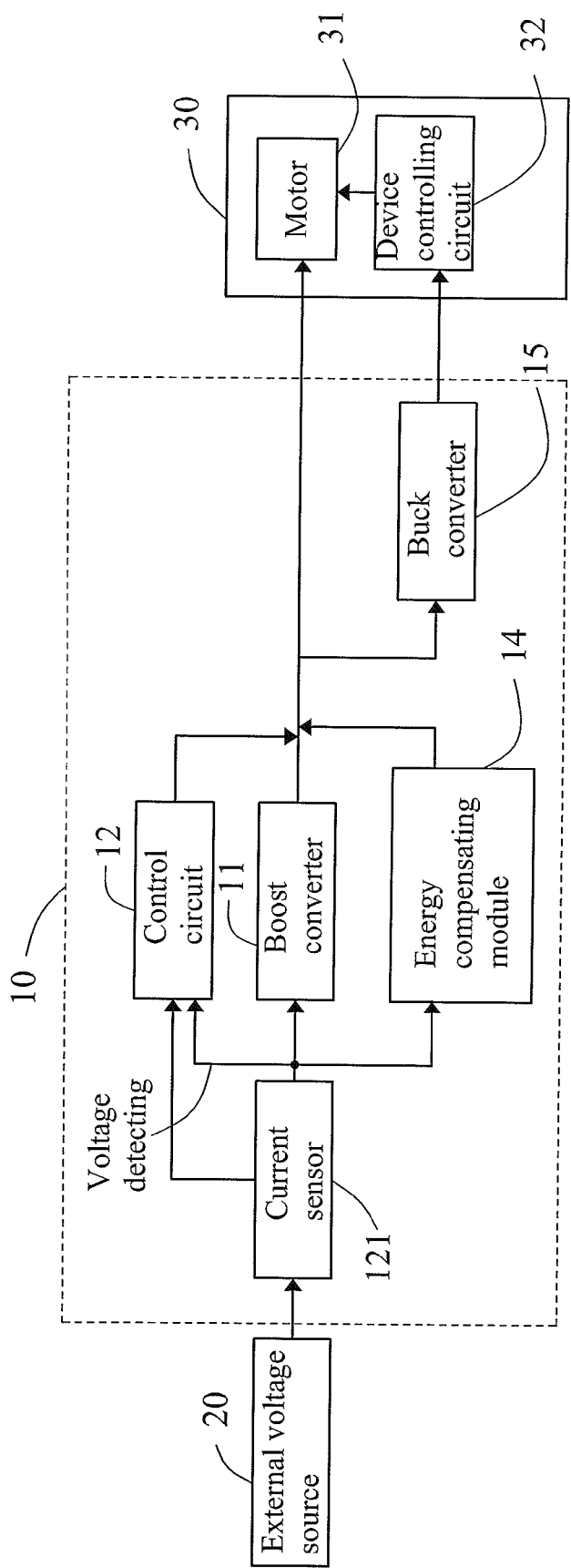
FIG. 2 illustrates a second embodiment of the present invention.

Please refer to FIG. 2 which illustrates a second embodiment of the present invention. Under normal conditions, the switching power supply 10 is electrically connected to the external voltage source 20 of 5 V so as to drive the device controlling circuit 32 of the device having high peak current characteristic 30. In some conditions, the current for driving the motor 31 is very large, and the motor 31 is driven via the boost converter 11 by the external voltage source 20, however, the external voltage source 20 cannot provide stable 5 V additionally for the device controlling circuit 32 due to large output current, and then the device having high peak current characteristic 30 cannot be normally driven and started up. Therefore, a buck converter 15 is provided and connected between the output end of the boost converter 11 and the device controlling circuit 32 of the device having high peak current characteristic 30. The 12~12.6 V output voltage of the boost converter 11 is converted to the stable 5 V by the buck converter 15 so as to drive the device controlling circuit 32, and then the device having high peak current characteristic 30 can be normally driven and started up. In the present embodiment, an input end of the buck converter 15 is connected between the boost converter 11 and the switch module 13, and an output end of the buck converter 15 is connected to the device controlling circuit 32 of the device having high peak current characteristic 30 such as a mobile storage device, but is not limited in it, the input end of the buck converter 15 can also be connected between the switch module 13 and the motor 31. In other words, the input end of the buck converter 15 is connected to any location between the boost converter 11 and the motor 31.

Figure 3A:
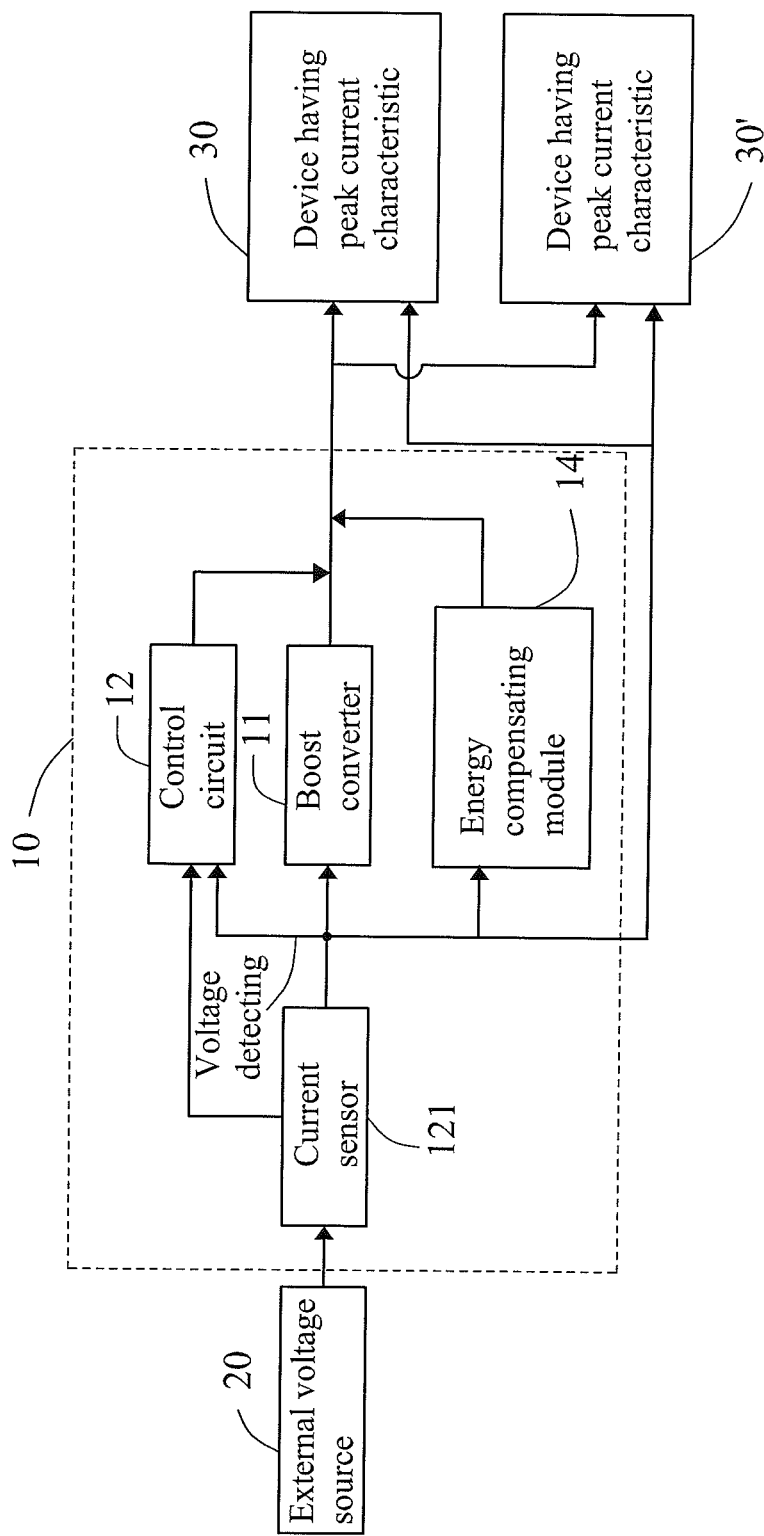
FIG. 3A illustrates a third embodiment of the present invention.

Please refer to FIG. 3A which illustrates a third embodiment of the present invention. In some conditions, the switching power supply 10 needs to drive multiple devices having high peak current characteristic 30. For example, the devices having high peak current characteristic 30 are multiple 3.5 inches hard disk drives such as RAID (Redundant Array of Independent Disks), and an output end of the switch module 13 is connected to the independent devices having high peak current characteristic 30, respectively. Multiple 5 V output voltages of the external voltage source 20 are also connected to the independent devices having high peak current characteristic 30, respectively. As a result, multiple devices having high peak current characteristic 30 can be driven by the switching power supply 10.

Figure 3B:
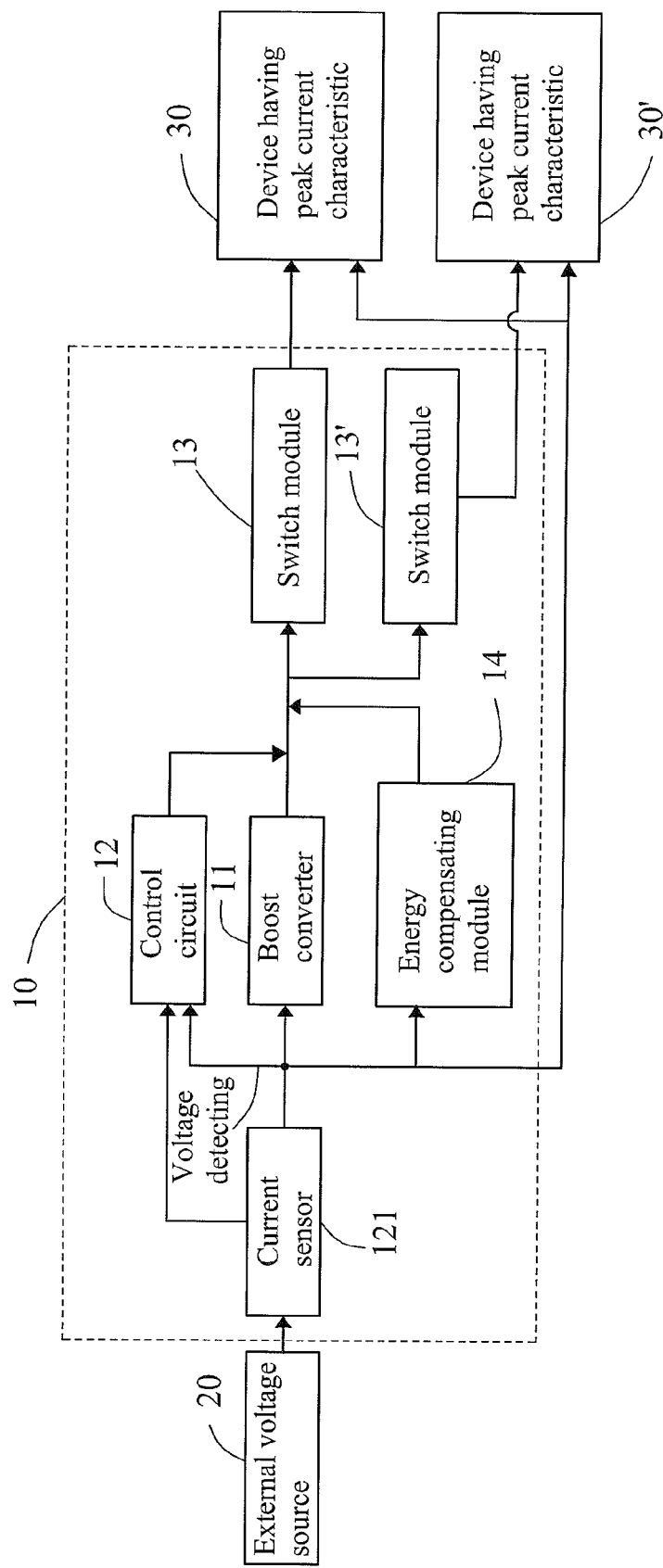
FIG. 3B illustrates a fourth embodiment of the present invention.

Please refer to FIG. 3B which illustrates a fourth embodiment of the present invention. In the third embodiment, the switching power supply 10 is configured to drive multiple devices having high peak current characteristic 30 at the same time. However, in some conditions, each device having high peak current characteristic 30 can be driven in sequence. Therefore, in the present embodiment, each device having high peak current characteristic 30 includes one correspondent switch module 13, a different period of startup time is set by the monitoring circuit 131 of each switch module 13 so as to make each device having high peak current characteristic 30 have its own different period of startup time. Thus, multiple devices having high peak current characteristic 30 can be driven and started up in sequence.

Figure 3C:
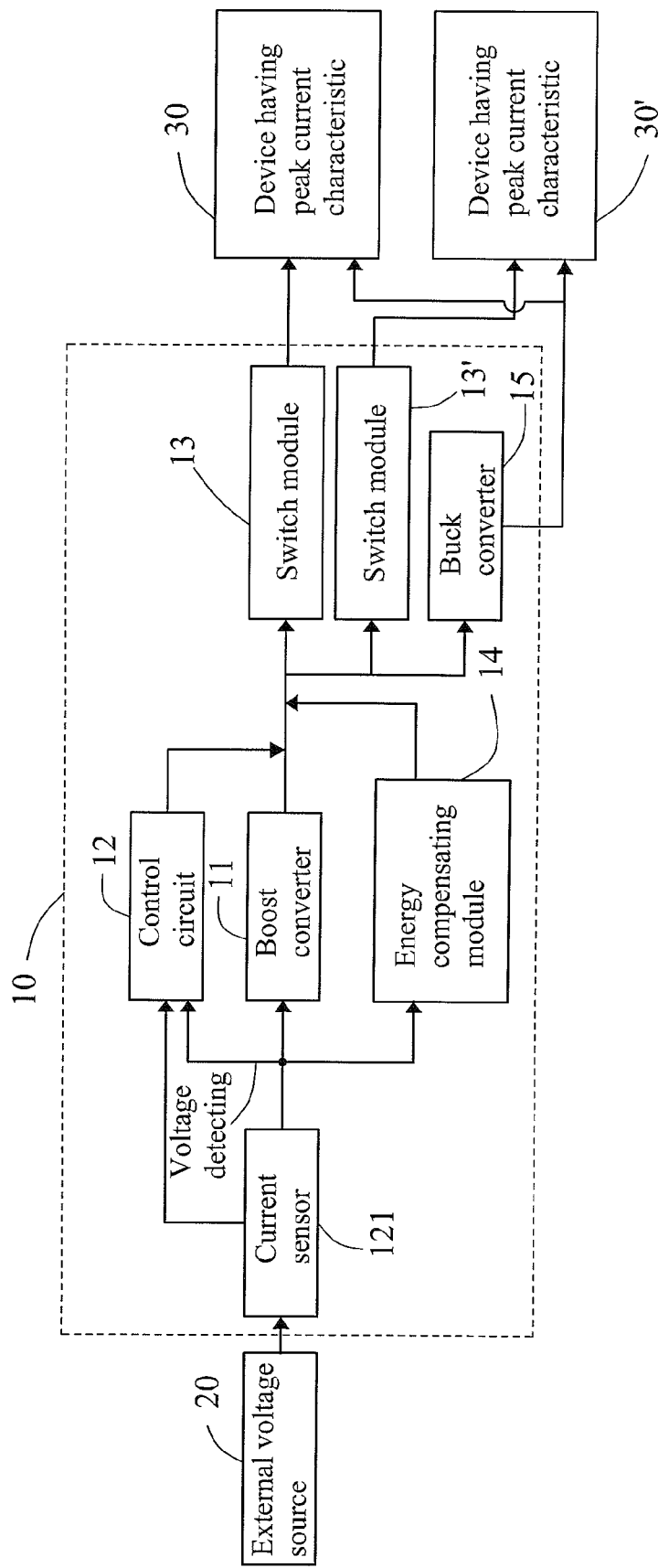
FIG. 3C illustrates a fifth embodiment of the present invention.

Please refer to FIG. 3C which illustrates a fifth embodiment of the present invention. When the external voltage source 20 needs to drive multiple devices having high peak current characteristic 30, the external voltage source 20 would carry heavy loading, so 5 V cannot be stably outputted for multiple devices controlling circuit 32. Therefore, the boost converter 11 is electrically connected to a buck converter 15, and the output end of the buck converter 15 is connected to multiple devices having high peak current characteristic 30 so as to make the device controlling circuit 32 of each device having high peak current characteristic 30 receive a stable 5 V. As a result, multiple devices having high peak current characteristic 30 can be normally driven.

The above-mentioned third embodiment to the fifth embodiment all are the examples of the switching power supply 10 of the present invention, but are not limited in them, a person having ordinary skills in the art could adjust or combine the technique features of the third embodiment to the fifth embodiment so as to make the switching power supply corresponding to different combinations of the device having high peak current characteristic 30 by request.

Moreover, in above-mentioned each embodiment, the device having high peak current characteristic 30 is the 3.5 inches hard disk drive, but is not limited in it, the device having high peak current characteristic 30 can also be a business machine, a printer, and an external compact disk drive etc. The switching power supply 10 of the present invention can be disposed in any device which needs the larger high peak current in some transient period. Furthermore, the driven object of the switching power supply 10 is not limited as the motor 31. The driven object can also be the other object. For example, the driven object is like an electronic component of a central processing unit (CPU) which having the larger high peak current.

With the switching power supply 10 of the present invention, the device having high peak current characteristic 30 can be driven and started up without connecting to any extra power supply. In US2014091621, the device having high peak current characteristic is completely driven by the battery during startup, so the battery with larger size is needed. The energy storing element 141 of the present invention is an assistant, auxiliary component for compensation of insufficient energy shortly, the energy is mainly provided from the external voltage source 20 via the boost converter 11, and the energy storing element 141 is quickly discharged with large current only if the external voltage source 20 cannot provide high enough voltage and energy. As a result, a battery with smaller size or capacitance can be selected and used as the energy storing element 141, so the overall cost of the switching power supply 10 can be reduced.

Figure 4:
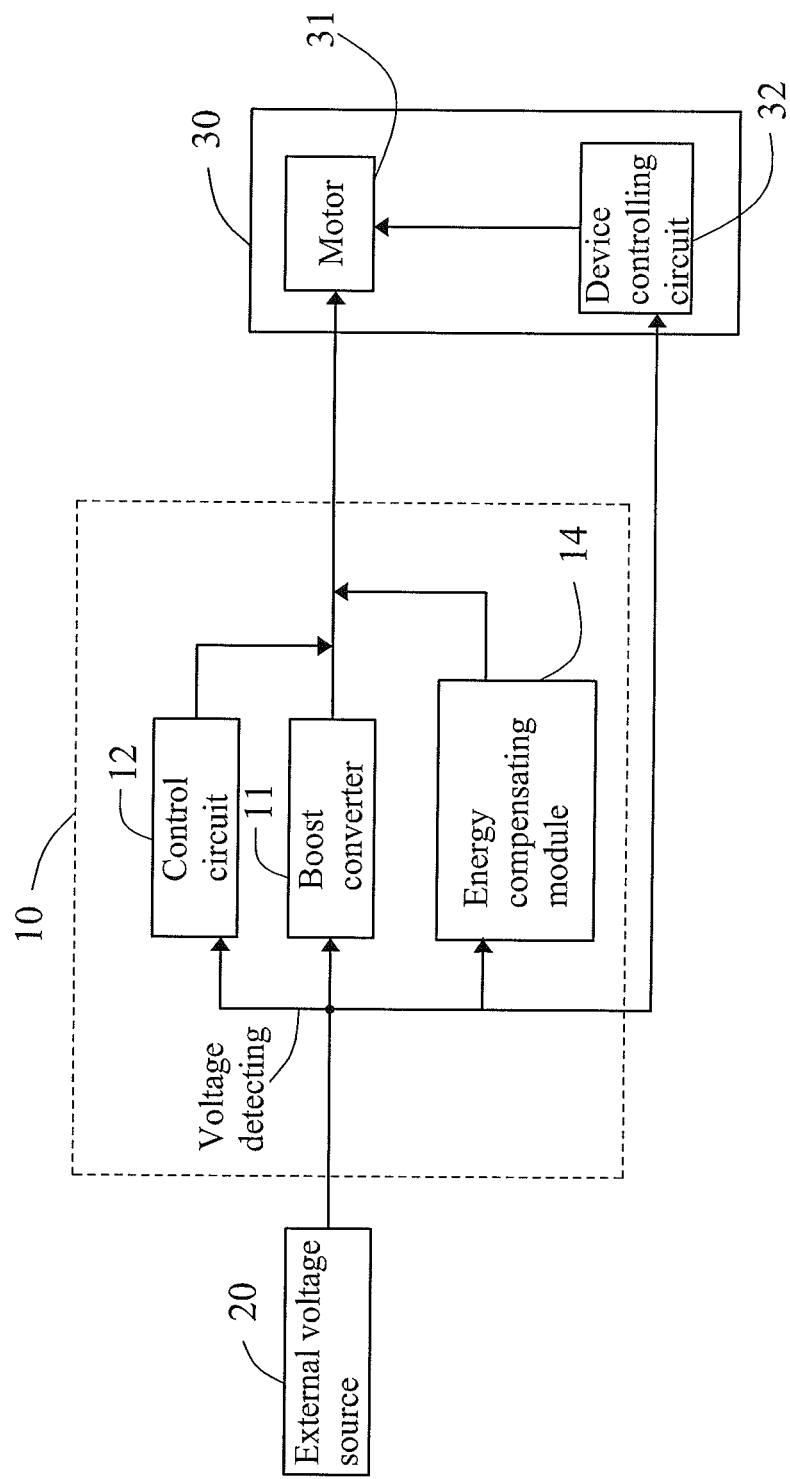
FIG. 4 illustrates a sixth embodiment of the present invention.

In the above embodiments, each switching power supply 10 includes the current sensor 121. However, the person having ordinary skill in the art can decide not to dispose the current sensor in the switching power supply 10 (shown in FIG. 4). In FIG. 4, the input end of the boost converter 11 is directly connected to the external voltage source 20.

The person having ordinary skill in the art will readily observe that numerous modifications and alternatives of the device and method may be made while retaining the teachings of the invention. Accordingly, the above disclosure should be construed as limited only by the meters and bounds of the appended claims.

What is claimed is:

1. A switching power supply, connected between an external voltage source and at least a device having high peak current characteristic, the switching power supply comprising:
   a boost converter, an input end of the boost converter electrically connected to the external voltage source, and an output end of the boost converter electrically connected to the device having the high peak current characteristic;
   a control circuit connected to the boost converter in parallel, the control circuit configured to sense the output voltage of the external voltage source, the control circuit having a setting of a first predetermined voltage value and a predetermined current value;
   a charging circuit, an input end of the charging circuit connected to an output end of the boost converter;
   a discharging circuit, an output end of the discharging circuit electrically connected to the device having the high peak current characteristic; and
   an energy storing element, an output end of the energy storing element connected to an input end of the discharging circuit and an output end of the charging circuit;
   wherein, when the output current of the external voltage source is larger than the predetermined current value or the output voltage of the external voltage source is lower than the first predetermined voltage value, the output voltage of the boost converter is reduced quickly until being lower than the output voltage of the energy storing element by the control circuit.

2. The switching power supply of claim 1, further comprising a first switch element, wherein an input end of the first switch element is connected to the external voltage source, the first switch element is connected to the input end of the discharging circuit and the output end of the charging circuit, the first switch element is not electrically conducted when the output voltage of the external voltage source is zero, the first switch element is electrically conducted when the output voltage of the external voltage source is larger than zero.

3. The switching power supply of claim 1, further comprising at least a switch module, wherein the switch module comprises a second switch element and a monitoring circuit, the second switch element is electrically connected between the boost converter and the device having the high peak current characteristic, and the monitoring circuit is electrically connected between the boost converter and the second switch element, the second switch element is electrically conducted when the output voltage of the boost converter exceeds a second predetermined voltage value.

4. The switching power supply of claim 3, wherein a predetermined period of time is set in the monitoring circuit, after the switching power supply receives power sent from the external voltage source for the predetermined period of time, the second switch element is electrically conducted.

5. The switching power supply of claim 1, further comprising a current sensor connected between the external voltage source and the boost converter, wherein the current sensor is configured for sensing the output current of the external voltage source.

6. The switching power supply of claim 1, wherein the discharging circuit is a diode or a discharging control circuit having a switch.

7. The switching power supply of claim 1, wherein the energy storing element is charged by the charging circuit in the constant voltage and/or constant current.

8. A switching power supply, connected between an external voltage source and at least a device having high peak current characteristic, the switching power supply comprising;
- a boost converter, an input end of the boost converter electrically connected to the external voltage source, and an output end of the boost converter electrically connected to the device having high peak current characteristic;
- a control circuit connected to the boost converter in parallel, the control circuit configured to sense the output voltage of the external voltage source, the control circuit having a setting of a first predetermined voltage value and a predetermined current value;
- a charging circuit, an input end of the charging circuit connected to an output end of the boost converter;
- a discharging circuit, an output end of the discharging circuit electrically connected to the device having high peak current characteristic;
- an energy storing element, an output end of the energy storing element connected to an input end of the discharging circuit and an output end of the charging circuit; and
- a buck converter, an input end of the buck converter connected to the output end of the boost converter, and an output end of the buck converter connected to the device controlling circuit of the device having high peak current characteristic;
- wherein, when the output current of the external voltage source is larger than the predetermined current value or the output voltage of the external voltage source is lower than the predetermined voltage value, the output voltage of the boost converter is reduced quickly until being lower than the output voltage of the energy storing element by the control circuit.

9. The switching power supply of claim 8, further comprising a first switch element, wherein an input end of the first switch element connected to the external voltage source, the first switch element connected to the input end of the discharging circuit and the output end of the charging circuit, the first switch element is not electrically conducted when the output voltage of the external voltage source is zero, the first switch element is electrically conducted when the output voltage of the external voltage source is larger than zero.

10. The switching power supply of claim 8, further comprising at least a switch module, wherein the switch module comprises a second switch element and a monitoring circuit, the second switch element is electrically connected between the boost converter and the device having high peak current characteristic, and the monitoring circuit is electrically connected between the boost converter and the second switch element, when the output voltage of the boost converter exceeds a second predetermined voltage value, the second switch element is electrically conducted.

11. The switching power supply of claim 10, wherein a predetermined period of time is set in the monitoring circuit, after the power sent from the external voltage source is received by the switching power supply for the predetermined period of time, the second switch element is electrically conducted.

12. The switching power supply of claim 8, wherein the discharging circuit is a diode or a discharging control circuit having a switch.

13. The switching power supply of claim 8, wherein the energy storing element is charged by the charging circuit in the constant voltage and/or constant current.

14. The switching power supply of claim 8, further comprising a current sensor connected between the external voltage source and the boost converter, wherein the current sensor is configured for sensing the output current of the external voltage source.

* * * * *